J. MILLAR.
BELT HINGE FASTENER AND PIN.
APPLICATION FILED JUNE 8, 1918.
1,300,632.
Patented Apr. 15, 1919.
2 SHEETS—SHEET 1.
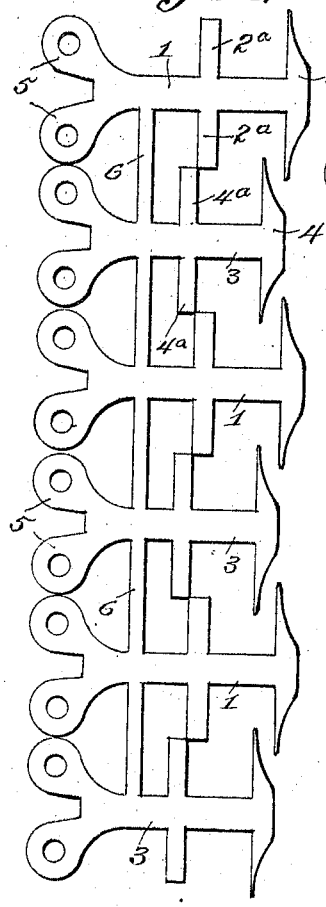
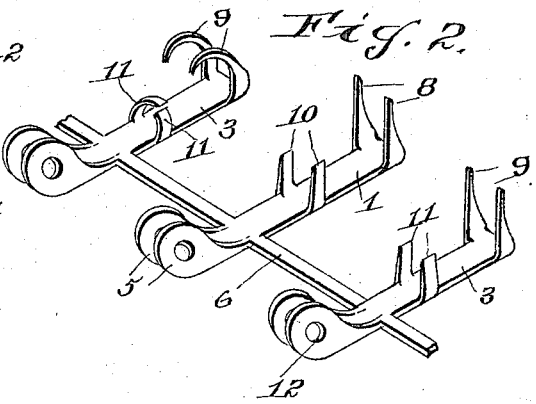
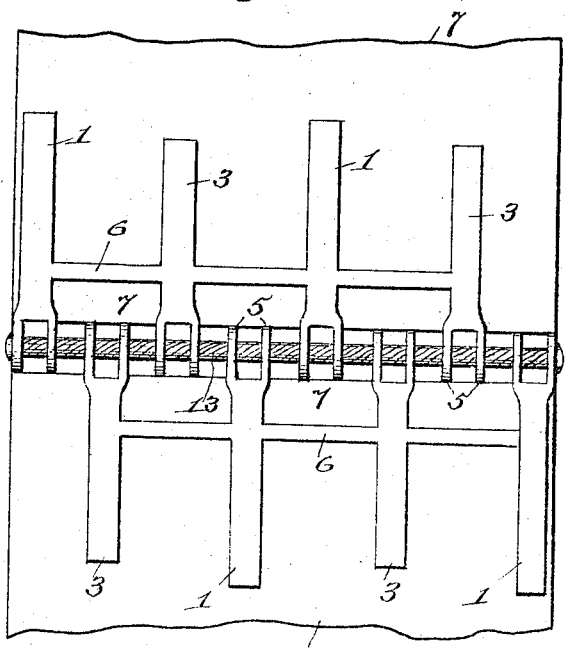
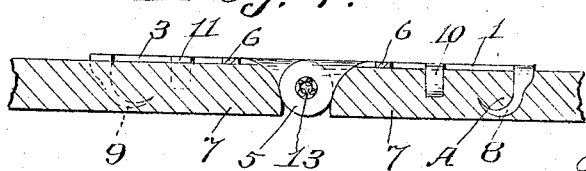
Inventor
John Millar
By C. F. Belt
Attorney.

J. MILLAR.
BELT HINGE FASTENER AND PIN.
APPLICATION FILED JUNE 8, 1918.
1,300,632.
Patented Apr. 15, 1919.
2 SHEETS—SHEET 2.
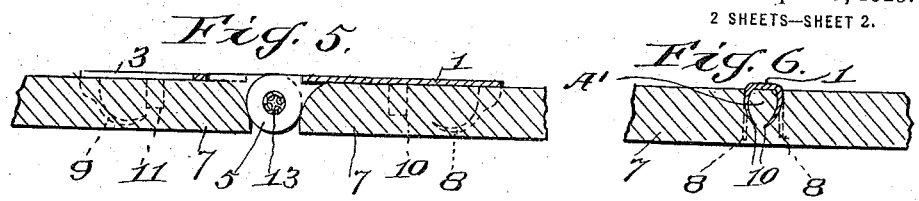
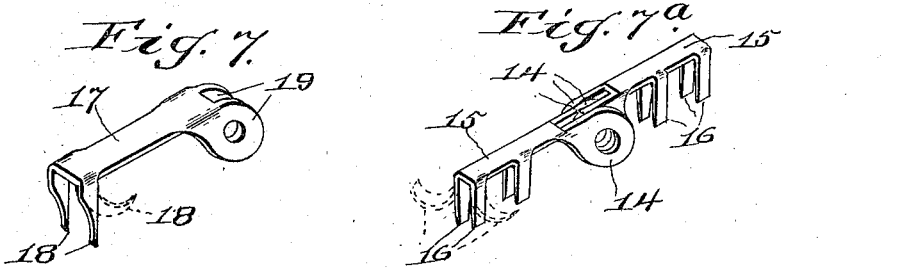
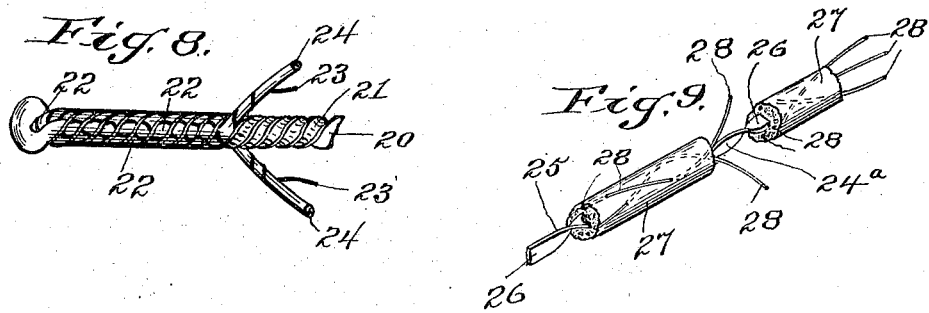
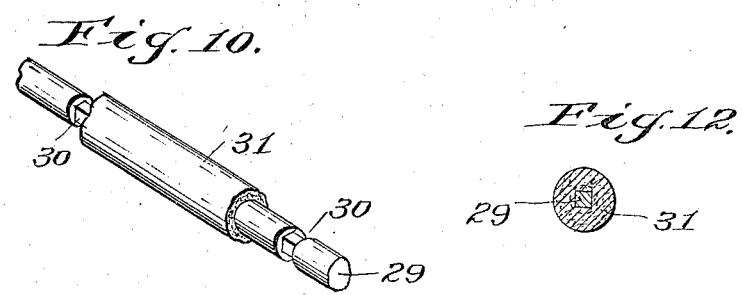
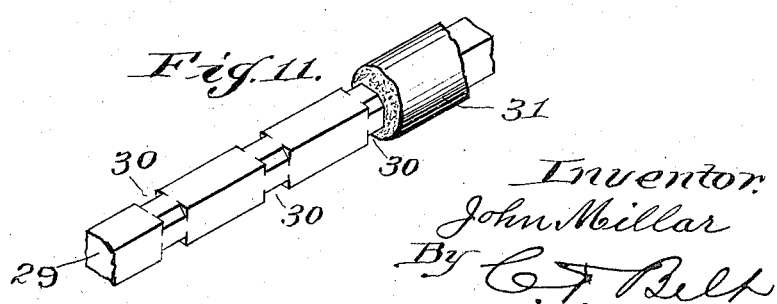
Inventor.
John Millar
By C. F. Belt
Attorney.

UNITED STATES PATENT OFFICE.

JOHN MILLAR, OF CINCINNATI, OHIO.

BELT-HINGE FASTENER AND PIN.

1,300,632.  Specification of Letters Patent.  Patented Apr. 15, 1919.

Application filed June 8, 1918. Serial No. 238,889.

*To all whom it may concern:*

Be it known that I, JOHN MILLAR, a citizen of the United States, residing at Cincinnati, in the county of Hamilton and State of Ohio, have invented certain new and useful Improvements in Belt-Hinge Fasteners and Pins, of which the following is a specification.

This invention relates to belt fasteners, and pertains especially to hinge fasteners and to a special pin for hinging the fasteners.

The object of the invention is to provide a novel and peculiar hinge fastener applicable to the outer face of the meeting ends of pulley belts, and to furnish a pin of novel and peculiar construction and composition for connecting the hinge members.

A further object of the invention is to provide a hinge belt fastener applicable only to the outer face of a belt, and of such construction and relative arrangement of parts as to afford a multiple grip of the belt ends at various points adjacent to said ends, and to furnish specially devised gripping or clenching prongs depending from opposite sides of a plate and bendable toward the hinge end of the fastener in a clenching operation from the outer face of the belt.

A still further object of the invention is to provide a hinge pin of such novel and peculiar construction and arrangement of parts as to afford a metallic core and a composition pin member held by the core and forming a jacket or partial covering for the core so as to reduce or lessen frictional wear on the hinge members, and to form a flexible hinge bearing.

Various other objects, advantages and improved results are attainable in the practical application of the invention hereinafter fully described.

In the accompanying drawings forming part of this application:

Figure 1 is a plan view, showing one-half of a hinge fastener as cut or stamped out and having a plurality of connected members.

Fig. 2 is an inverted perspective view of part of the fastener shown in Fig. 1, with certain members bent or pressed into position for application to a belt.

Fig. 3 is a top view, showing belt ends hinged.

Fig. 4 is a sectional view, showing the hinge members clenched to the meeting ends of a belt.

Fig. 5 is a similar section taken through another part of one member of the fastener.

Fig. 6 is a cross section of a belt end, showing certain of the clenching prongs in section and other prongs in dotted lines.

Fig. 7 is a detail perspective view of a single fastening member. Fig. 7$^a$ is a perspective view of a further modification.

Fig. 8 is a detail elevation of part of the hinge pin, showing its members partly separated.

Figs. 9 and 10 show modifications of the pin.

Fig. 11 is a perspective view, showing a further modification of the pin. Fig. 12 is a cross section taken through one of the notches.

The same reference characters denote the same parts throughout the several views of the drawings.

It has been found highly essential in this class of belt fasteners to provide means for accomplishing the following results:

First. The avoidance of contact of metal fasteners with belt pulleys as far as possible so as to preserve the fastener as well as the pulleys, and to prevent slipping by metallic contact.

Second. To attach the fastener to the belt so that the belt ends may have as much flexibility as possible and thereby conform with the pulleys in passing around the latter.

Third. To attach the fasteners so that the clenching members of the fasteners may clench in such position as to leave belt portions between them. And, Fourth. To employ a hinge pin of such construction and composition as to avoid frictional wear of the hinge members and of the pins. These and other results are attainable in the improved fasteners and hinge pin constituting my invention.

In carrying out my invention I employ thin sheet metal adapted to be cut or stamped out for forming the hinge members, each in one piece, as clearly shown in Fig. 1 of the drawings, so as to form a plurality of parallel arms 1 having lateral projections 2, 2$^a$, similar shorter arms 3 having similar projections 4 and 4$^a$, a pair of wings 5 on one end of said arms, and a cross rib 6 flexibly connecting these arms.

As shown in Fig. 2 of the drawings, the parts are pressed or bent into position for application to the meeting ends of a belt 7. The projections 2 and 4 form pointed clenching prongs 8 and 9 depending respectively from opposite side edges of the arms 1 and 3 adjacent to one end of said arms so that the prongs 8 are not opposite the prongs 9. The same arrangement is made of the prongs 10 and 11, so that these prongs and the prongs 8 and 9 are spaced apart and thereby leave unclenched belt portions therebetween and between the prongs of the respective arms and between the arms, and afford unusual and desired flexibility in the fastening ends of the belt. The outer edge of the prongs 8 and 9 are beveled and are adapted to bend or curl longitudinally or lengthwise the arms and toward the end of a belt in a clenching operation. The prongs 10 and 11 have flattened piercing ends and are adapted to bend or curl toward each other in pairs crosswise the arms in a clenching operation, so that these arms clench belt portions crosswise adjacent to the belt ends, while the prongs 8 and 9 make their clench of the belt at right angles to the clench of the prongs 10 and 11, and back of the latter, leaving the belt ends with such unclenched portions as to afford sufficient flexibility therein to follow the surface of pulleys in operation, and thereby avoiding liability of rupture or tearing away of the belt ends by reason of the usual rigid or inflexible condition in and adjacent to the belt ends caused by ordinary fastening devices.

The wings 5 are pressed or bent downwardly at right angles to the side edges of the arms and have an eye 12 for a hinge pin 13, hereinafter particularly described. The cross rib 6 not only forms a flexible connection of the arms, but it lies next to the end edge of the belt and forms a seat or abutment for the belt ends. Both hinge members of the fastener being of the same construction, I have described only one of them in detail and obviously the eye wings of the pair of hinge members intermesh and are connected by the pin so that the eye wings of one member ride side by side on the pin with the eye wings of the other member, as clearly shown in Fig. 3 of the drawings. But the pin wings or eyes may be varied; for example, as shown in Fig. 7ª of the drawings, the eyes 14 may intermesh, as the arms 15 are narrow, and the clenching prongs 16 are all flat-pointed and may spread outwardly from the arms in a clenching operation.

Obviously, the arms lie flat against the outer face of the belt and the prongs pierce through the belt from said face and are then turned into the belt from the inner face of the belt so as to clench a small portion, as A, and A' of the belt in a clenching operation which depresses or embeds the turned portion of the prongs into the inner face of the belt in a clenching operation and thereby reduces or practically eliminates the fastener, or any part thereof, from the inner face of the belt, to the avoidance of frictional contact of metal prongs with a belt pulley.

Referring to the modification shown in Fig. 7 of the drawings, a specimen of a single hinge member or arm 17 has only one pair of clenching prongs 18 and a pair of hinge pin ears 19. Two or more of these may be used separately on each end of a belt for connecting said ends.

The hinge pin comprises a central member or core 20 composed of metal twisted lengthwise or otherwise shaped to form a spiral groove 21 into which is wound a member 22 composed of twisted wire 23 and fabric material 24, such as cotton, hemp or other suitable material. The member 22 is preferably notched into one end of the member 20 central of the length of the member 22, so that one-half of the member 22 is wound into one of the grooves 21 and the other half is wound into the companion groove to the other end of the member 20. The ends of the member 20 may be bent or turned inwardly with the ends of the member 22 for enlarging the ends of the pin after it is run through the hinge eyes 12. It will be seen that the grooves are filled with the member 22, and the latter protrudes from the grooves slightly above the edge of the grooves so as to overcome or avoid frictional wear of the member 20 and the hinge eyes. This core or member 20 may be varied in shape and the fabric and wire composition member may also be varied, as shown in the modifications, Figs. 9 and 10 of the drawings. Referring particularly to Fig. 9, the groove 24 of the core member 25 is intersected by flattened portions 26, and the covering sleeve is composed of woven fabric material 27 having strands of wire 28 woven or threaded spirally lengthwise of the sleeve. In Fig. 10 the metal core member 29 has notches 30 for holding an all fabric sleeve 31 thereon. Said sleeves forming flexible hinge bearings. Obviously, these cores may be shaped in various other forms for retaining the other member thereon. Therefore, I do not wish to be understood as confining my invention in this respect, nor in respect to the member held by the core member. Neither do I wish to limit myself to any particular size, material or number of arms and prongs comprising the hinge members, but reserve the right to make such changes and variations in practical manufacture and application as may come within the scope of the appended claims.

Having thus described my invention, what I claim as new and desire to secure by Letters Patent is:

1. In a hinge fastener for belts, a plurality of arms, each arm terminating in a pair of depending hinge eyes and in a pair of flexible clenching prongs adapted to be bent edgewise at the sides of the arms toward the eyes in a clenching operation.

2. In a belt hinge fastener, a plurality of arms, a plurality of flexible clenching prongs, the prongs of one set of arms intervening the prongs of the other arms and one set of prongs being bendable at right angles to the other set, a pair of hinge eyes depending from one end of each arm, and means for connecting the arms between the eyes and the prongs adjacent thereto.

3. In a hinge fastener for belts, a plurality of arms each terminating in a pair of hinge eyes, flexible prongs bendable edgewise along the sides of the arms, and flexible prongs between the other prongs and the eyes and bendable across the arms in a belt clenching operation.

4. In a hinge fastener for belts, a plurality of hinged arms, eye members on one end of the arms, and flexible plate prongs on the other end of the arms and bendable edgewise toward the eyes in a clenching operation.

5. A pin for hinge belt fasteners comprising a central metallic member having a retaining surface, and an outer fabric member fitting said surface and constituting the principal eye bearing for the hinge members.

6. A pin for hinge belt fasteners comprising a central metallic member having a retaining surface, and a united wire and fabric member fitting said surface and partly exposing the latter so that both members form a hinge bearing.

7. A pin for hinge belt fasteners comprising a spirally grooved member, and a member contained in the groove and forming with the grooved member a continuous bearing surface for the hinge members.

8. A hinge fastener for belts, comprising independent arms, a pair of hinge eyes formed on the side edges of the arms and depending therefrom, a pair of flexible clenching prongs projecting from said edges in horizontal plane with the eyes and bendable lengthwise the arms in a clenching operation, and a hinge pin having a fabric bearing surface for the eyes and forming a flexible hinge connection.

In witness whereof I hereunto set my hand in the presence of two witnesses.

JOHN MILLAR.

Witnesses:
A. L. YELTON,
MARIE HARPER.

Copies of this patent may be obtained for five cents each, by addressing the "Commissioner of Patents, Washington, D. C."